United States Patent [19]

Thompson

[11] Patent Number: 5,254,840
[45] Date of Patent: Oct. 19, 1993

[54] MOUNTING FOR METAL HONEYCOMB STRUCTURES

[75] Inventor: David F. Thompson, Painted Post, N.Y.

[73] Assignee: Corning Incorporated, Corning, N.Y.

[21] Appl. No.: 805,643

[22] Filed: Dec. 12, 1991

[51] Int. Cl.[5] .................. H05B 3/44; F01N 3/10; B32B 3/12
[52] U.S. Cl. .................... 219/544; 219/205; 392/485; 392/488; 422/174; 428/116; 60/300
[58] Field of Search ............... 219/542, 541, 544, 552, 219/553, 205–208; 392/502, 347, 379, 485, 486, 488, 490; 422/174, 175, 177, 179, 180; 502/527, 439; 60/300; 423/212 C, 239; 428/116

[56] References Cited

U.S. PATENT DOCUMENTS

| | | | |
|---|---|---|---|
| 2,884,091 | 4/1959 | Baldwin | 55/500 |
| 2,952,333 | 9/1960 | Bush | 55/500 |
| 3,112,184 | 11/1963 | Hollenbach | 264/59 |
| 3,242,649 | 3/1966 | Rivers | 55/150 |
| 3,444,925 | 5/1969 | Johnson | 165/166 |
| 3,790,654 | 2/1974 | Bagley | 264/56 |
| 4,740,408 | 4/1988 | Mochida et al. | 428/116 |
| 4,758,272 | 7/1988 | Pierotti-Wusirika | 75/246 |
| 4,928,485 | 5/1990 | Whittenberger | 60/299 |
| 5,063,029 | 11/1991 | Mizuno et al. | 422/175 |
| 5,140,813 | 8/1992 | Whittenberger | 60/300 |

*Primary Examiner*—Bruce A. Reynolds
*Assistant Examiner*—Michael D. Switzer
*Attorney, Agent, or Firm*—B. R. Turner

[57] ABSTRACT

A mounting assembly is disclosed for a metallic honeycomb resistance heater structure wherein a pair of complementary ceramic honeycomb structures are utilized on opposite sides of the metallic honeycomb structure to not only mechanically support the same within an enclosing housing, but also to electrically insulate the resistance heater from such housing.

7 Claims, 2 Drawing Sheets

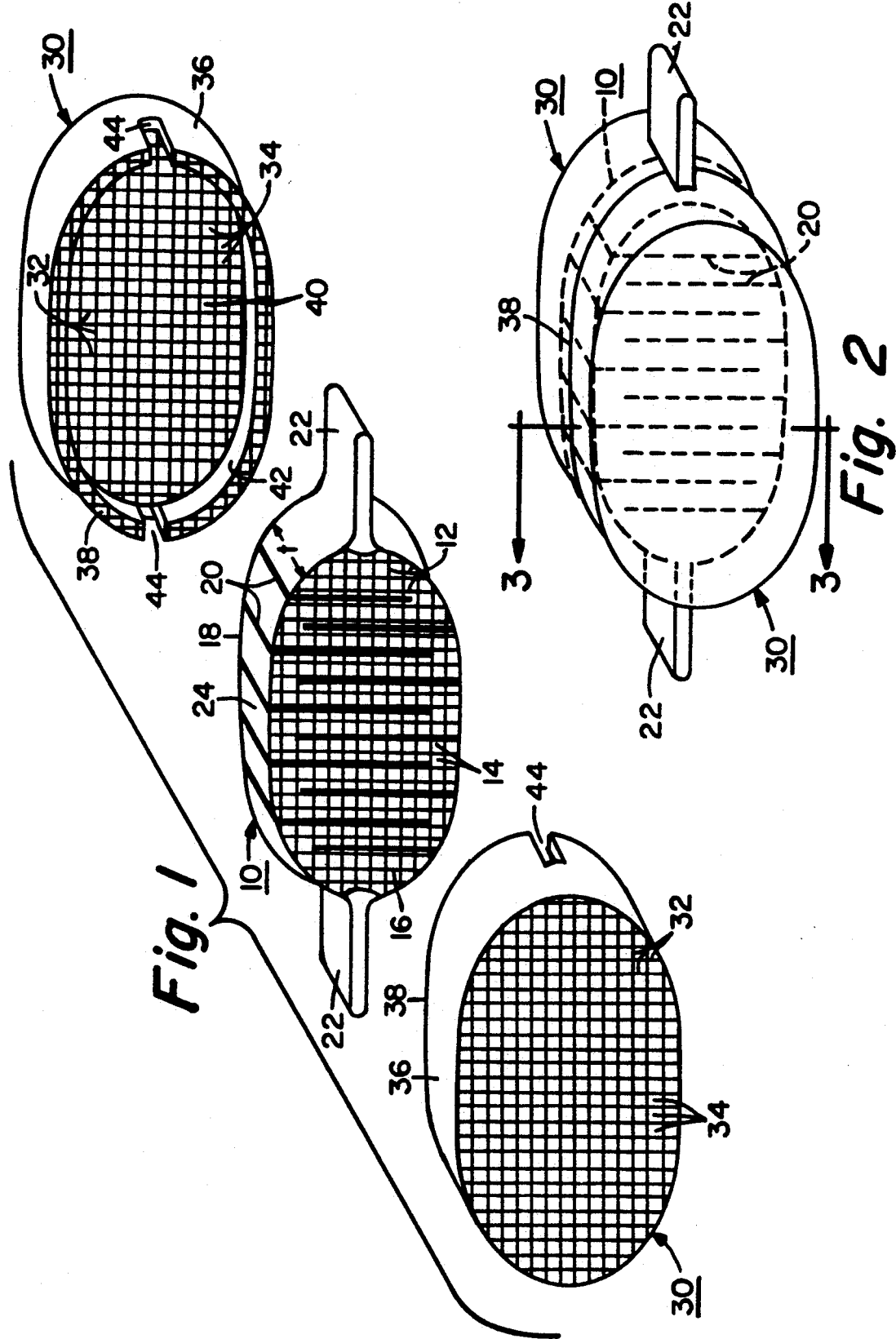

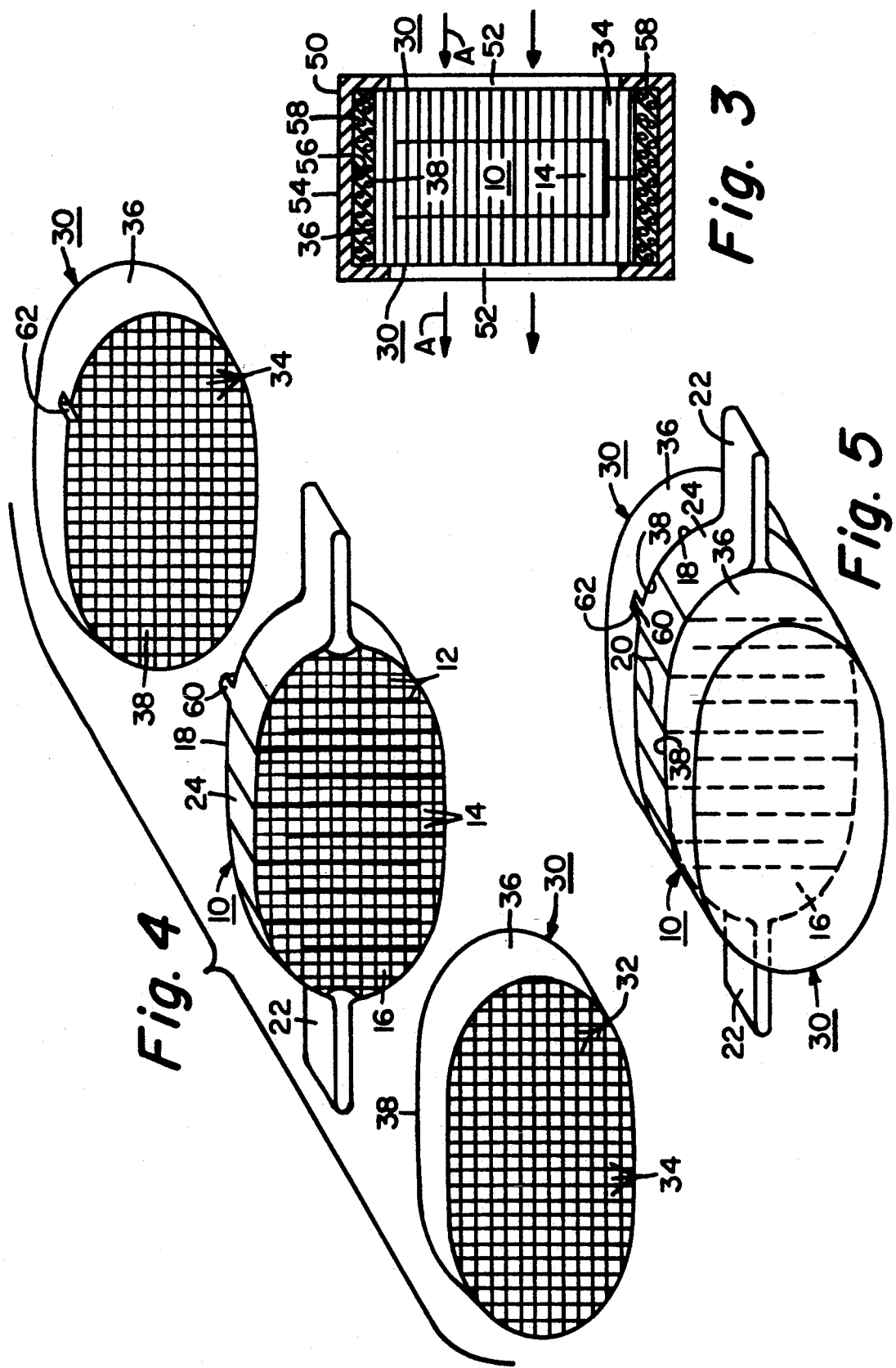

MOUNTING FOR METAL HONEYCOMB STRUCTURES

BACKGROUND OF THE INVENTION

This invention relates to the art of mounting thin-walled metal honeycomb structures, such as those that would have utility as a substrate or heater in controlling emissions from a gasoline or diesel internal combustion engine. Such metal structures may be formed by extrusion from extrudable particulate metal batch materials which have the property of being able to flow or plastically deform during extrusion, while being able to become sufficiently rigid immediately thereafter so as to maintain their structural integrity, in the manner set forth in U.S. Pat. Nos. 3,790,654 and 4,758,272. Alternatively, the honeycomb structures may be fabricated from thin metal sheets such as by wrapping corrugated and uncorrugated metal sheets into a honeycomb structure as shown in U.S. Pat. Nos. 3,112,184 and 3,444,925. Further, if desired, the honeycomb structures could be made of pleated thin porous sheets of filter material whose layers are interleaved with corrugated or crimped spacers as disclosed in U.S. Pat. Nos. 2,884,091, 2,952,333 and 3,242,649.

The invention particularly relates to the problem of preventing degradation of the metal honeycomb substrate when utilized in and subjected to the harsh and rigorous conditions experienced in vehicular emissions control systems. When mounted in an exhaust stream of a vehicle, cellular metal honeycombs can be resistively heated for the purpose of accelerating the time in which pollutants may be converted. However, such mounted resistive heaters must withstand severe shock and vibration at elevated temperatures, which temperatures may exceed 920° C. and such forces may exceed 20 g's. Even the relatively high temperature metals utilized in such cellular substrates exhibit a rather large and unfavorable reduction in mechanical properties as the temperature rises, potentially leading to heater distortion. Such distortion could result in electrical short circuits to ground, in the closure of resistance adjusting slots which would shorten the electrical path length, and in distortion of the flow cells which would compromise the gas flow therethrough.

It thus has been an object of the invention to provide a mounting system for metal honeycomb structures which not only protectively supports the structure within an enclosing housing, but also electrically insulates the metal honeycomb structure from such housing.

SUMMARY OF THE INVENTION

In its simplest form, the present invention sets forth the use of non-conductive honeycomb structures for mechanically supporting and electrically insulating a metal honeycomb structure. As a result, the mechanically supported and electrically insulated metal honeycomb structure may be utilized as a resistance heater in such applications as vehicular and industrial emissions control systems. The non-conductive supporting honeycomb structures are preferably positioned on opposite sides of the metal honeycomb structure with the cells of the non-conductive honeycomb structures being opened to the cells of the metal honeycomb structure such that the longitudinal axis of the cells of the metal honeycomb structure are parallel with the longitudinal axis of the cells of the non-conductive honeycomb structure, so that exhaust gases may flow freely through such adjacent structures.

BRIEF DESCRIPTION OF THE DRAWINGS

FIG. 1 is a schematic exploded view of a preferred embodiment of the invention showing a pair of recessed non-conductive support honeycomb structures on opposite sides of a metal honeycomb structure having electrode connection tabs formed thereon.

FIG. 2 is a schematic oblique view showing the structures of FIG. 1 in an assembled form.

FIG. 3 is a schematic cross-sectional view taken along line of 3—3 of FIG. 2, showing the assembly of FIG. 2 within an enclosing canister housing.

FIG. 4 is a schematic exploded view of a further embodiment of the invention.

FIG. 5 is a schematic oblique illustration of the assembled units of FIG. 4.

DESCRIPTION OF THE PREFERRED EMBODIMENTS

Referring now to FIGS. 1 and 2, a metallic honeycomb structure 10 of a desired peripheral configuration is shown having a plurality of webs 12 defining a plurality of cells 14 therebetween, which cells extend longitudinally through the body portion of the metallic honeycomb structure and terminate in opposed inlet and outlet faces 16, 18. A plurality of slits 20 are shown formed in the metallic honeycomb structure 10, which function as a resistance adjusting mechanism when the metallic honeycomb structure is utilized as a resistance heater. A pair of electrode connector tabs 22 are shown formed on the body portion of structure 10 at opposite sides thereof, and are continuous with an outer skin or wall 24 of the honeycomb structure.

A pair of non-metallic ceramic support honeycomb structures 30 are shown having a plurality of webs 32 forming a plurality of cells 34 extending longitudinally through the support honeycomb structures 30 and terminating at their opposite ends in opposed face portions. The webs 32 and cells 34 are bounded by an outer skin or wall 36. Each support structure 30 has a face 38 which is recessed a distance d to form a recessed face portion 40, having a peripheral configuration substantially identical with that of the body portion of metallic honeycomb structure 10, and a peripheral recessed wall 42 bounding the peripheral extent of face portion 40. In addition, a pair of slots 44 are formed in each face 38 to a given distance d.

Referring now to FIG. 2, when the depth d of the recess formed in each face 38 of support structures 30 is equal to one-half the thickness t of the metallic honeycomb structure 10, the support structures 30 will completely enclose the body of the metallic honeycomb structure 10, when the units are assembled as shown in FIG. 2. In fact, when the distance d of the recess in each of the support structures 30 is equal to one-half of the thickness t of the metallic structure 10, the faces 38 of the support structures 30 will be abutting. Further, each of the opposed faces 16, 18 of the metallic honeycomb structure 10 will be in contact with a face portion of each of the supporting structures 30, depending upon the relative recess distances d which are formed in the face 38.

That is, if one support structure 30 has a recessed distance d equal to the thickness t of the metal honeycomb structure 10, such that the resulting recess could receive the entire thickness of the body of the metal structure 10, then the recess distance d in the face 38 of the other supporting structure would be zero. In such case, one of the opposed faces 16, 18 of the metallic structure 10 would be in contact with the recessed surface portion 40 in one supporting structure 30, and the other opposed face would be in contact with face 38 of the other supporting structure 30. Generally, the total recessed distances d+d in both of the supporting structures should not exceed the thickness t of the metallic structure, however since it is not necessary that the faces 38 of the support structures abut one another, the total recess distance, d+d, of both supporting structures, may be less than the thickness t of the metal honeycomb structure 10. However, if the recess depth d in one supporting structure 30 is great enough to encompass and retain the thickness t of body 10, then a second supporting structure 10 may not be required. In such case d may be greater than t to provide the necessary protective supporting enclosure. Further, the recess formed in the face 38 is configured so that the peripheral recessed wall 42 snugly receives and engages the outer wall 24 of the metallic honeycomb structure 10, with the electrode tabs 22 extending through the slots 44. For purposes of clarity, the webs and cells have not been shown in FIG. 2.

When the assembly of FIG. 2 is utilized as a resistance heater in an emissions control system, it is preferably encased or retained within a can or canister housing 50, having opposed openings 52 formed in the sidewalls thereof, for facilitating the flow of exhaust gases, represented by arrows A, through appropriate conduits (not shown). The metallic honeycomb structure 10, which may be in the form of a resistance heater, is insulatably enclosed within and supported by the two support honeycomb structures 30. Although the outer peripheral wall 36 may be configured to conform with the inner peripheral surface 56 of peripheral wall 54 of the enclosing housing 50, if desired, additional insulating and impact absorbing material 58 may be positioned between the inner peripheral surface 56 of the housing 50 and the outer wall 36 of the support structures 30. In order to facilitate the flow of the exhaust gases through the heater assembly of FIG. 3 and to minimize back pressure, the cells 34 of the supporting structures 30 are preferably relatively large in cross-sectional open area compared to the cross-sectional open area of cells 14 of the resistance heater body 10. Further, as shown in FIG. 3 the metal honeycomb resistance heater structure 10 may be fully encapsulated by the non-conductive ceramic honeycomb support structures 30, which not only insulate the heater body 10 from the retaining housing 50, but also mechanically support the heater body within the housing to protect the same from severe shock and vibration.

Referring now to FIG. 4 and 5, a further embodiment of the invention is shown including the metal honeycomb structure 10 and a pair of non-metal honeycomb support structures 30. The metallic honeycomb structure 10 and the non-metallic or ceramic honeycomb support structures 30 are similar to those shown in FIGS. 1 and 2, with the exception that no recesses are formed in the faces 38 of the support structures 30. Accordingly, when the units of FIG. 4 are assembled as shown in FIG. 5, the faces 38 of the support structures 30 engage the opposed inlet and oulet faces 16 and 18 of the metallic honeycomb structure 10, and preferably the outer walls 36 of the support structures 30 form a complementary or continuous outer wall with the outer wall 24 of the metallic honeycomb structure 10. Again, it is preferred that the cross-sectional open area of cells 34 of the support structures 30 are formed relatively large with respect to the open cross-sectional area of cells 14 of the metallic structure 10, in order to minimize back pressure and facilitate the flow of exhaust gases through the assembly.

In order to more accurately align the faces 38 of the support structures with the faces 16 and 18 of the metallic honeycomb structure 10, one such face may be provided with one or more projections such as 60, and the cooperative face may be provided with one or more alignment recesses such as 62, so as to more easily orient and interlock the faces 38 with the faces 16 and 18.

The embodiment of FIGS. 4 and 5 functions the same as the embodiment of FIGS. 1 and 2, with the exception that the supporting honeycomb structures 30 of the embodiment shown in FIGS. 4 and 5 have an outer peripheral wall 36 which is configured so as to be coincident with the configuration of outer wall 24 of the metal honeycomb structure 10. Accordingly, in the embodiment of FIGS. 4 and 5, the supporting structures 32 do not overlie the outer wall 24 of the metallic honeycomb structure 10 as is the case in the embodiment of FIGS. 1 and 2. In both embodiments, however, the faces 38 of the supporting structures 30 are in close contact with the inlet and outlet faces 16, 18 of the metallic honeycomb resistor body 10, and thus the relatively high rigidity of the ceramic honeycomb support structures 30 provide improved mechanical support for the metallic heater body.

Whereas fibrous materials which have been customarily utilized for providing sealing between the heater and the housing are subject to breakdown and blowout due to the short length of the usual heater, the ceramic honeycomb structures 30 present a longer monolith surface for providing a durable sealing between the heater and the can. A further advantage of utilizing cellular ceramic support structures resides in the option of catalyzing the cells to assist in the conversion of the exhaust gases passing therethrough. That is, the supporting structures, themselves, may function as supplemental catalytic converters.

As far as this invention is concerned, it is really immaterial as to how the cellular of honeycomb structures 10 and 30 are formed. As previously pointed out, the honeycomb structures 10 and 30 may be formed by extrusion as set forth in U.S. Pat. Nos. 3,790,654 and 3,919,384, or alternatively they may be formed by wrapping a corrugated material into a honeycomb structure such as disclosed in U.S. Pat. Nos. 3,112,184 and 3,444,925. With respect to the desired composition of the metallic honeycomb structure 10, various metal powders and/or metal sheets may be utilized which produce a desired resistive heater effect when an EMF is applied, and representative compositions are set forth in U.S. Pat. No. 4,758,272 and Brundage et al. U.S application Ser. No. 07/767,889, filed Sep. 30, 1991, assigned to the assignee of the present application and incorporated herein by reference. Further, with respect to the composition of the non-metallic ceramic support honeycomb structures 30, a variety of non-conductive ceramic materials such as cordierite and those set forth in the U.S. Pat. Nos. 3,790,645, 3,919,384, 3,112,184, and 3,444,925 patents previously mentioned.

By sandwiching a metal honeycomb resistance heater between ceramic cellular material, or surrounding such heater with cellular ceramic material, it is possible to mechanically support the metallic honeycomb heater and electrically isolate the same from an enclosure such as a typical housing can utilized in vehicle emissions control systems. The ceramic cellular structures 30 may be retained about the metal honeycomb structure 10 by being compressed together within housing 50, or by any suitable means such as bonding, clamping and sintering. Thus, the use of non-metallic ceramic honeycomb support structures such as 30 about metallic honeycomb resistance heaters, which have an unfavorable reduction in mechanical properties at elevated temperatures, serves to protect such heaters from severe shock and vibration, particularly when utilized in a vehicular environment.

Although the now preferred embodiments of the invention have been disclosed, it will be apparent to those skilled in the art that various changes and modifications may be made thereto without department from the spirit and scope thereof as defined in the appended claims.

I claim:

1. A method of mechanically supporting and electrically insulating a metallic honeycomb structure which comprises:
   providing a metallic honeycomb structure with a central body portion of desired peripheral configuration and having opposed inlet and outlet faces with a plurality of cells extending longitudinally through said central body portion of said metallic honeycomb structure and terminating at their opposite ends across a full central portion of said opposed inlet and outlet faces;
   providing at least one ceramic honeycomb structure having a complementary peripheral configuration substantially identical to the peripheral configuration of said body portion of said metallic honeycomb structure, and having a plurality of cells extending longitudinally therethrough which terminate at their opposite ends in opposed cellular face portions;
   positioning one of said cellular face portions in contact with at least one of said inlet and outlet faces with said cellular face portion bounded by said complementary peripheral configuration such that said peripheral configurations are contiguous;
   aligning and interlocking said metallic honeycomb structure with said at least one honeycomb structure by providing at least one projection and at least one mating recess in the opposed contact faces of said metallic honeycomb structure and said ceramic honeycomb structure; and
   retaining said ceramic honeycomb structure with the entire cellular face of said one face portion in contact with the entire central portion of said at least one inlet and outlet face so as to mechanically support and electrically insulate said metallic honeycomb structure.

2. A mounting assembly for mechanically supporting and electrically insulating a metallic honeycomb structure which comprises:
   a metallic honeycomb structure to be supported having a central body portion of desired thickness and having an outer wall of desired peripheral configuration bounding opposed first and second cellular faces, and said opposed faces having a plurality of cells extending longitudinally through the thickness of said body portion and terminating at their opposite ends in, and across the full extent of, said opposed cellular faces;
   a first and second honeycomb structure, each having an outer wall with a peripheral configuration complementary with that of said metallic honeycomb structure outer wall, and each having a plurality of cells extending longitudinally therethrough terminating at their opposite ends in opposed face portions;
   each of said ceramic honeycomb structures having a face portion with a peripheral configuration substantially identical to said desired peripheral configuration of said metallic honeycomb structure;
   a face portion of a first of said ceramic honeycomb structures being in contact with the first of said opposed cellular faces of said metallic honeycomb structure substantially across its extent;
   a face portion of a second of said ceramic honeycomb structures being in contact with the second of said opposed cellular faces of said metallic honeycomb structure substantially across its extent;
   a recess formed in a surface of each of said honeycomb structures a given distance to form said face portion having a peripheral configuration substantially identical to that of said desired peripheral configuration of said metallic honeycomb structure;
   a peripheral recessed wall bounding said recess and defining the peripheral configuration of said face portion;
   said metallic honeycomb structure being positioned within each of said recess with a portion of said desired peripheral configuration of said body portion being snuggly recessed and engaged by said peripheral recessed wall of each recessed honeycomb structure;
   each of said recessed face portions having a portion of said surface surrounding the same with said surface portions being in engagement with one another, and with said metallic honeycomb structure being enclosed within said recesses formed within said ceramic honeycomb structures; and
   housing means retaining said ceramic honeycomb structures in contact with said opposed faces of said metallic honeycomb structure for mechanically supporting and electrically insulating said metallic honeycomb structure.

3. A mounting assembly as defined in claim 2 wherein the combined recess steps formed in said ceramic honeycomb structures is equal to the desired thickness of the body portion of said metallic honeycomb structure.

4. A mounting assembly as defined in claim 2, wherein the total distance of said recesses formed within said ceramic honeycomb structures is equal to the desired thickness of the body portion of said metallic honeycomb structure.

5. A mounting assembly as defined in claim 2 wherein the given distance of the recess in each of said ceramic honeycomb structures is equal to one-half of the desired thickness of the body portion of said metallic honeycomb structure.

6. A mounted metallic honeycomb resistance heater assembly which comprises:
   a metallic honeycomb resistance heater structure having a central body portion, said body portion being of a desired thickness and having an outer wall of desired peripheral configuration bounding opposed inlet and outlet faces, a plurality of cells extending longitudinally through the thickness of said body portion and terminating at their opposite ends in, and across the full extent of, a central cellular portion of said opposed inlet and outlet faces;

a ceramic honeycomb structure positioned on each side of the body of said metallic honeycomb structure with one such ceramic honeycomb structure in contact with said inlet face and the other of said ceramic honeycomb structures being in contact with said outlet face;

each of said ceramic honeycomb structures having an outer wall with a complementary peripheral configuration substantially identical to the peripheral configuration of said body portion of said metallic honeycomb structure, and having a plurality of cells extending longitudinally through said structure and terminating at their opposite ends in opposed cellular face portions bounded by said complementary peripheral configuration;

an entire cellular face portion of said one ceramic honeycomb structure being in full contact with the central cellular portion of said inlet face of said body portion, and an entire cellular face portion of said other ceramic honeycomb structure being in full contact with the central cellular portion of said outlet face of said body portion;

said body portion of said metallic honeycomb resistance structure and at least one of said ceramic honeycomb structures having complementary projection and recesses in their adjacent faces for aligning and interlocking the two structures; and housing means for retaining said ceramic honeycomb structures in supporting contact with said metallic honeycomb body portion of said resistance heater structure for not only mechanically supporting said metallic honeycomb resistance heater structure but also electrically insulating the same.

7. A mounted heater assembly as defined in claim 6 wherein said desired outer peripheral configuration of the outer wall of said ceramic honeycomb structures complements said desired peripheral configuration of the body portion of said metallic honeycomb resistance heater structure, and said outer walls are contiguous.

* * * * *